Aug. 6, 1935.  C. L. KOONCE ET AL  2,010,636
TREE SCARIFYING TOOL
Filed Oct. 1, 1934  3 Sheets-Sheet 2
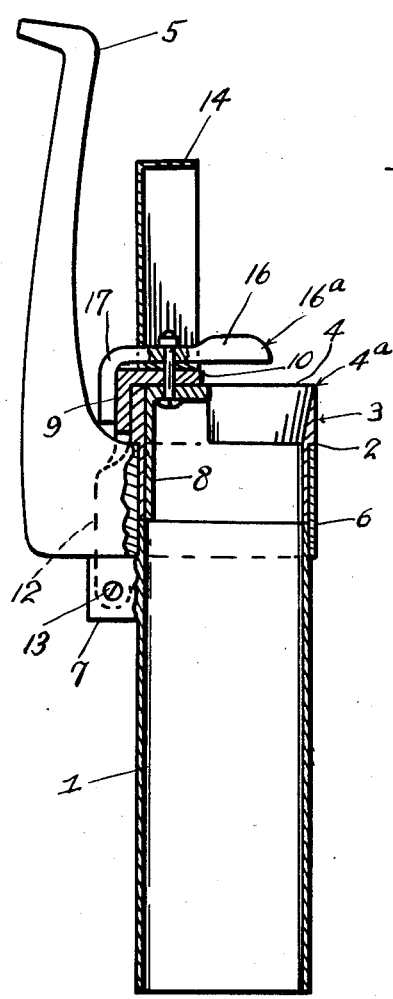
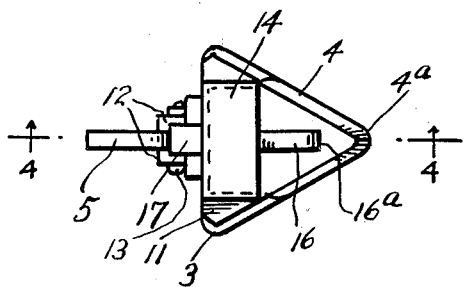
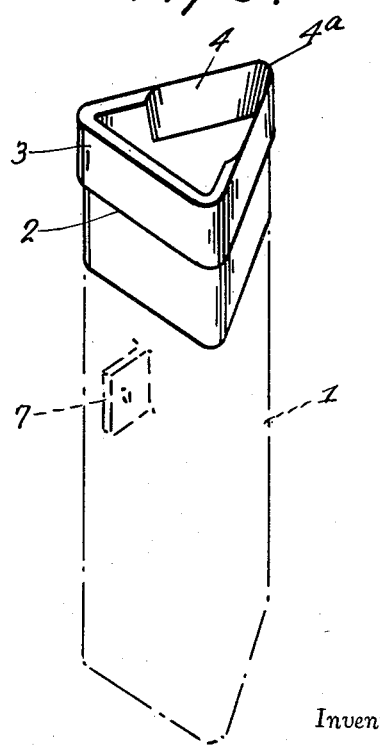
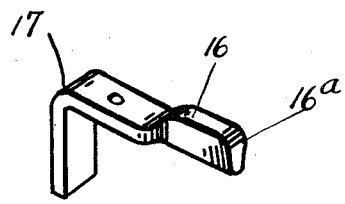
Inventors
C. L. Koonce
O. E. Zipperer
By Clarence A. O'Brien
Attorney Aug. 6, 1935. C. L. KOONCE ET AL 2,010,636
TREE SCARIFYING TOOL
Filed Oct. 1, 1934 3 Sheets-Sheet 3

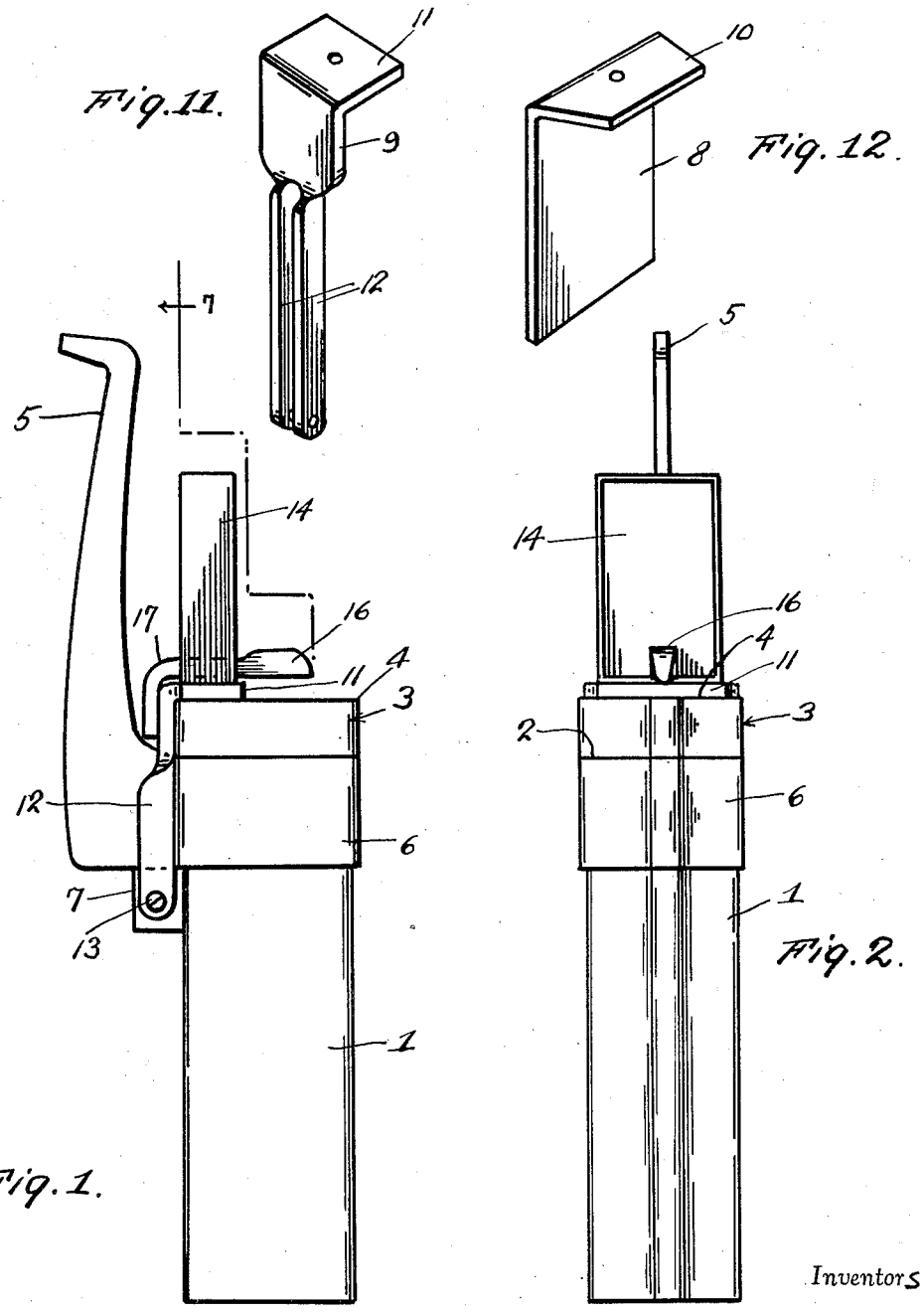

Inventors
C. L. Koonce
O. E. Zipperer
By Clarence A. O'Brien
Attorney

Patented Aug. 6, 1935

2,010,636

UNITED STATES PATENT OFFICE 2,010,636

TREE SCARIFYING TOOL

Claude L. Koonce and Otis E. Zipperer,
Coleman, Fla.

Application October 1, 1934, Serial No. 746,434

10 Claims. (Cl. 47—13)

This invention relates to a tool for scarifying pine trees to obtain the gum.

Among the objects of the invention are to make a tool that is strong and durable and at the same time economical from a manufacturing and maintenance standpoint; to provide a tool having means to catch the chips and bark that come off the tree in the process of scarifying and to keep them from falling into the cups placed to catch the gum; to provide a tool which will insure the leaving of a smooth face on the tree so that the gum will flow to the cups without interference; and also to provide a tool which will cut off the same amount of wood each time, and which will cut a scar or streak that will meet all the requirements of the Federal Government specifications.

Heretofore, in scarifying the trees it has been almost impossible to keep the chips and bark from falling into the cups, causing the turpentine operator to have to pay for the chips and bark that was in the gum when it was dipped, also the extra expense of hauling and straining the chips and bark out of the rosin, besides making a lower grade of rosin, by the chips and bark making the rosin a darker color. Furthermore, considerable time is required with the present tools in use to sharpen them when the cutting edge becomes gapped. Sometimes it takes hours of work to put a tool in shape after it has become gapped, or is so badly broken that it must be replaced by a new tool.

New tools of the present type in use are expensive as four to eight new tools per year are required for each man employed by the operator. Also, the present tools are objectionable in that they have no provision for catching the bark and chips to keep them from falling into the cups. Such tools as are now generally used also leave a corrugated face on the tree in scarifying which causes the gum to form on the face of the tree where it hangs instead of falling into the cups, where the spirits evaporate about seventy-five percent. Also, present tools are not equipped to provide a gauge for the operator in aiding him to remove only that amount of wood required to meet the specifications of the Federal Government.

It is, therefore, a further object of the invention to provide a tool free of the difficulties and objections above noted and which almost invariably result with use of the present tools for scarifying trees.

The invention, together with its objects and advantages, will be best understood from a study of the following description taken in connection with the accompanying drawings, it being understood that the illustrated form of the invention is merely exemplary and that various changes in the form, proportions, and minor details of construction, within the scope of the claims, may be resorted to without departing from the spirit of the invention, or sacrificing any of the advantages thereof.

In the drawings:

Figure 1 is a side elevational view of the tool.

Figure 2 is a front elevational view thereof.

Figure 3 is a top plan view of the tool.

Figure 4 is a sectional view taken substantially on the line 4—4 of Figure 3.

Figure 5 is a perspective view of the chip container and cutting bit.

Figure 6 is a perspective view of the guide member.

Figures 11 and 12 are perspective views of plates used in the construction of the tool, and hereinafter more fully referred to.

Figure 7:
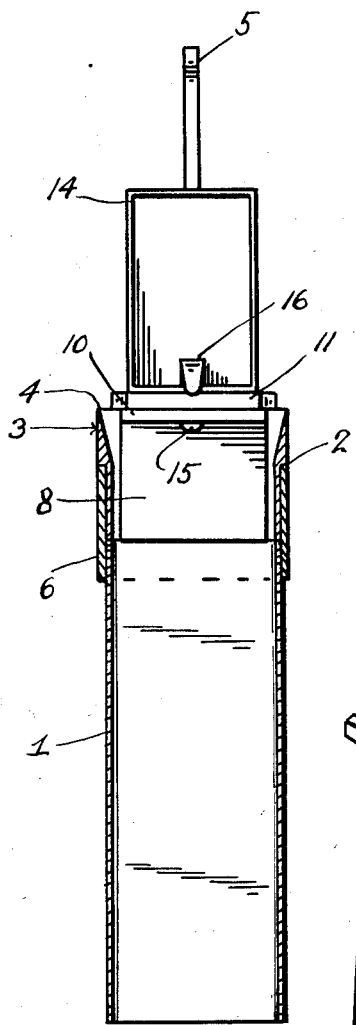
Figure 7 is a longitudinal sectional view taken substantially on the line 7—7 of Figure 1.
Figure 8:
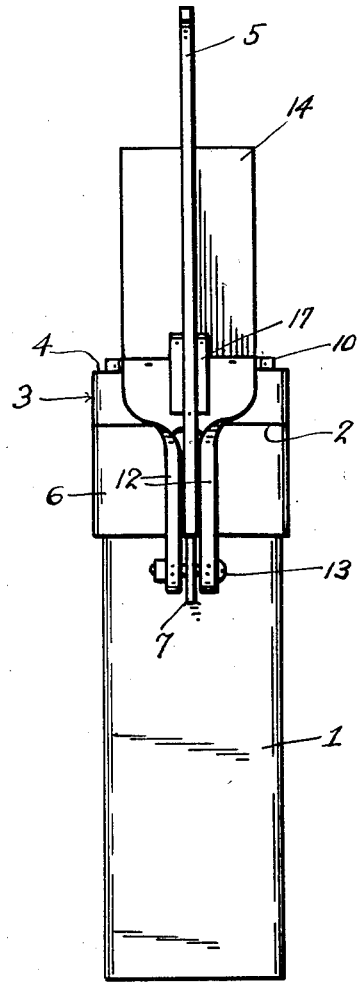
Figure 8 is a rear elevational view of the tool.
Figure 9:
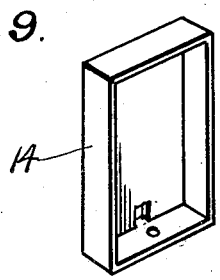
Figure 9 is a perspective view of the bark and dust container.
Figure 10:
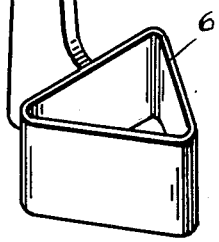
Figure 10 is a perspective view of the handle.

Referring to the drawings by reference numerals, it will be seen that the tool comprises a chip container 1 formed of suitable metal. The container 1 is of tubular form being preferably triangular in cross section and is open at each end. For the upper end of the container 1 there is provided a cutting bit or blade 3 which has two converging sides thereof and the angle between the said sides beveled internally to provide a cutting or scarifying edge 4.

A handle 5 is provided for the tool, and at one end the handle 5 has formed integral therewith a collar or sleeve 6 that fits about the container 1 and the body of the bit or blade 3 in abutting relation with the shoulder 2 on the body of the blade or bit as clearly shown. Below the collar or sleeve 6 of the handle the container 1 at the rear side thereof is provided with a lug 7 that cooperates with the shoulder 2 to retain the sleeve or collar 6 against longitudinal movement.

Arranged internally of the bit 3 is a plate 8 of the type shown in Figure 12, while disposed externally thereof is a plate 9 of the type and construction shown in Figure 11. Plates 8 and 9 at their upper ends are provided with flanges 10 and 11 respectively that extend inwardly or towards the front of the container 1 and are arranged in overlapping relation as clearly shown in Figure 4. The plate 9 is provided with a pair of co-extensive legs or sections 12 that extend along the rear side of the container 1 and straddle the handle 5 and plate 7 being secured to the plate 7 through the medium of bolt and nut means 13.

A shallow box-like bark and dust container 14 formed of metal or other suitable material extends from the bit-equipped end of the container 1 in the direction of the length of the container and is secured in position through the medium of a nut-equipped bolt 15 that extends through alined apertures provided in the plate flanges 10 and 11 and in one end wall of the container 14 as best shown in Figure 4.

A depth gauge 16 projects beyond the open side of the container 14 and is arranged in advance of the bit of the tool as shown in Figure 4. The gauge 16 has a rounded work engaging nose 16a that engages the wood of the tree in a manner to prevent cutting too deeply into the bark. Integral with the gauge 16 is a substantially right angularly bent shank 17 that extends through the back wall of the container 14. The shank 17 at the part thereof disposed within the container 14 is apertured to accommodate the bolt 15 through the medium of which the gauge 16 is secured in position. The free end of the shank 17 rests against the plate 9 as shown in Figure 4. The shank 17 being rectangular in cross section and the opening in the rear wall of the receptacle 14 being of a shape corresponding to the cross sectional shape of the shank 17, said shank will be held against rotating about the bolt 15 as an axis.

In operation, the tool is held in the hand by the handle 5 with the front angle of the container 1 facing the tree and with the bit or drill 3 so disposed that it will cut into the wood to a depth regulated by the gauge 16 as the tool is moved lengthwise along the trunk of the tree. The depth of the first scar on the tree will of course regulate the depth that the tool cuts into the tree. The bit 3 is so sharpened, and as previously described, that it will cut into the wood at the angle formed between the sharpest edges 4 of the bit, said sharpened edges at said angle forming a point 4a that pierces the wood to initiate the cutting or scarifying of the tree.

In actual practice it will be found that the tool will cut what is generally known in the art as a "full shade streak".

During the scarifying operation, the wood and bark cut off the tree passes into the container 1, there to remain until the rear end, that is the end remote from the drill 3, of the container 1 is lowered, when such wood and bark will pass from the container through said rear or trailing end. Also, during the scarifying operation, the small particles of bark and dust that are shattered off the head of the drill 3 will be caught by the container 14.

What is claimed is:

1. A tool of the character described comprising a sleeve, a handle connected with the sleeve, a cutting element having a tubular body fitting at one end within said sleeve, a bark and dust container extending forwardly from the cutting element adjacent one side of the latter and substantially parallel to the handle, and means securing said cutting element, container and handle equipped sleeve in assembled relation.

2. A tool of the character described comprising a sleeve, a handle connected with the sleeve, a cutting element having a body fitting at one end within said sleeve, a tubular-open-ended chip container having an end fitting within said sleeve in abutting relation to the referred to end of the body of said cutting element, a bark and dust container secured to the cutting element at the end thereof opposite to said chip container and disposed adjacent to one side of the body of the cutting element.

3. A tool of the character described comprising a sleeve, a handle connected with the sleeve, a cutting element having a body fitting at one end within said sleeve, a tubular, open-ended chip container having an end fitting within said sleeve in abutting relation to the referred to end of the body of said cutting element, a bark and dust container secured to the cutting element at the end thereof opposite to said chip container and disposed adjacent to one side of the body of the cutting element, and a gauge secured to the cutting element and extending forwardly of the bark and dust container in advance of the cutting element.

4. A tool of the class described comprising a tubular, open-ended chip container, a cutting element of the same cross sectional shape as the container and disposed in end abutting relation with the container, a handle provided with a sleeve embracing the meeting ends of the container and the cutting element, a depth gauge disposed in advance of said cutting element and extending inwardly from one side of the cutting element and means securing said container, cutting element, depth gauge and handle equipped sleeve in assembled relation.

5. A tool of the class described comprising a tubular, open-ended chip container, a cutting element of the same cross sectional shape as the container and disposed in end abutting relation with the container, a handle provided with a sleeve embracing the meeting ends of the container and the cutting element, and means securing said container, cutting element and handle equipped sleeve in assembled relation, said means including plates disposed interiorly and exteriorly of the cutter element, bolt means securing said plates together at one end, said exterior plate having a pair of co-extensive projections straddling said handle, a lug on the container at the side of the sleeve opposite the cutting end of the cutting element, and bolt means securing said projections to the lug.

6. A tool of the class described comprising a tubular, open-ended chip container, a cutting element of the same cross sectional shape as the container and disposed in end abutting relation with the container, a handle provided with a sleeve embracing the meeting ends of the container and the cutting element, and means securing said container, cutting element and handle equipped sleeve in assembled relation, said means including plates disposed interiorly and exteriorly of the cutter element, bolt means securing said plates together at one end, said exterior plate having a pair of co-extensive projections straddling said handle, a lug on the container at the side of the sleeve opposite the cutting end of the cutting element, and bolt means securing said projections to the lug, a relatively shallow bark and dust container having one end wall thereof secured to the bolt secured ends of said plates and extending in a longitudinal direction at the rear side of the cutting element.

7. A tool of the class described comprising a tubular, open-ended chip container, a cutting element of the same cross sectional shape as the container and disposed in end abutting relation with the container, a handle provided with a sleeve embracing the meeting ends of the container and the cutting element, and means securing said container, cutting element and handle equipped sleeve in assembled relation, said means including plates disposed interiorly and exteriorly of the cutter element, bolt means securing said plates together at one end, said exterior plate having a pair of co-extensive projections straddling said handle, a lug on the container at the side of the sleeve opposite the cutting end of the cutting element, and bolt means securing said projections to the lug, a relatively shallow bark and dust container having one end wall thereof secured to the bolt secured ends of said plates and extending in a longitudinal direction at the rear side of the cutting element, and a depth gauge disposed in advance of the cutting element and having a shank secured by the first mentioned bolt means and extending through said bark and dust container parallel with said end of said dust and bark container.

8. In a tool of the class described, a substantially triangular-shaped, elongated, open-ended chip container, a cutting blade having a body of the same shape as said container and arranged in end-abutting relation with said container, said cutting blade body being provided with an external shoulder and said container on one side thereof being provided with a lug, a sleeve embracing the meeting ends of said container and body of the cutting element, and a plate secured to the body of the cutting element and having a projecting portion extending longitudinally of the container across said sleeve and secured to said lug for securing the parts in assembled relation.

9. In a tool of the class described, a substantially triangular-shaped, elongated, open-ended chip container, a cutting blade having a body of the same shape as said container and arranged in end-abutting relation with said container, said cutting blade body being provided with an external shoulder and said container on one side thereof being provided with a lug, a sleeve embracing the meeting ends of said container and body of the cutting element, and a plate secured to the body of the cutting element and having a projecting portion extending longitudinally of the container across said sleeve and secured to said lug for securing the parts in assembled relation, said cutting element having the forward edges of the converging side walls thereof sharpened and merging into a point at the angle between said side walls.

10. In a tool of the class described, a substantially triangular-shaped, elongated, open-ended chip container, a cutting blade having a body of the same shape as said container and arranged in end-abutting relation with said container, said cutting blade body being provided with an external shoulder and said container on one side thereof being provided with a lug, a sleeve embracing the meeting ends of said container and body of the cutting element, and a plate secured to the body of the cutting element and having a projecting portion extending longitudinally of the container across said sleeve and secured to said lug for securing the parts in assembled relation, said cutting element having the forward edges of the converging side walls thereof sharpened and merging into a point at the angle between said side walls, and a handle integral with said sleeve and disposed in a plane substantially parallel to the container and extending from the sleeve in a direction reverse to that of said container.

CLAUDE L. KOONCE.
OTIS E. ZIPPERER.